United States Patent [19]

Rinderle

[11] Patent Number: 4,792,992

[45] Date of Patent: Dec. 20, 1988

[54] RADIO RECEIVER

[75] Inventor: Heinz Rinderle, Heilbronn, Fed. Rep. of Germany

[73] Assignee: Telfunken Electronic GmbH, Heilbronn, Fed. Rep. of Germany

[21] Appl. No.: 170,630

[22] Filed: Mar. 15, 1988

Related U.S. Application Data

[63] Continuation of Ser. No. 807,343, Dec. 9, 1985, abandoned.

[30] Foreign Application Priority Data

Dec. 24, 1984 [DE] Fed. Rep. of Germany ....... 3447284

[51] Int. Cl.$^4$ .............................................. H04B 1/16
[52] U.S. Cl. ................................... 455/239; 455/247; 455/249
[58] Field of Search ............... 455/245, 247, 249, 250, 455/295, 311, 241–243, 239, 246, 200

[56] References Cited

U.S. PATENT DOCUMENTS

| | | | |
|---|---|---|---|
| 3,622,887 | 11/1971 | Byles | 455/250 |
| 4,126,828 | 11/1978 | Kumagai | 455/239 |
| 4,172,239 | 10/1979 | Harford | 455/249 |
| 4,479,254 | 10/1984 | Craiglow | 455/247 |
| 4,580,288 | 4/1986 | Rinderley | 455/247 |

FOREIGN PATENT DOCUMENTS 0168728  9/1984  Japan ..................... 455/249

Primary Examiner—Robert L. Griffin
Assistant Examiner—Curtis A. Kuntz
Attorney, Agent, or Firm—Spencer & Frank

[57] ABSTRACT

In a radio receiver in which the received signal is converted by mixing into an intermediate frequency signal and/or a baseband signal, and in which an apparatus is provided which generates an intermediate frequency signal and/or baseband signal and derives therefrom a control signal for suppression or reduction of interfering disturbances, the signal fed to the apparatus is distorted in the apparatus in such a way that the signal distortion effected in the apparatus is greater than the distortion to which the signal fed to the receiver is subjected in the receiving section of the receiver.

33 Claims, 11 Drawing Sheets

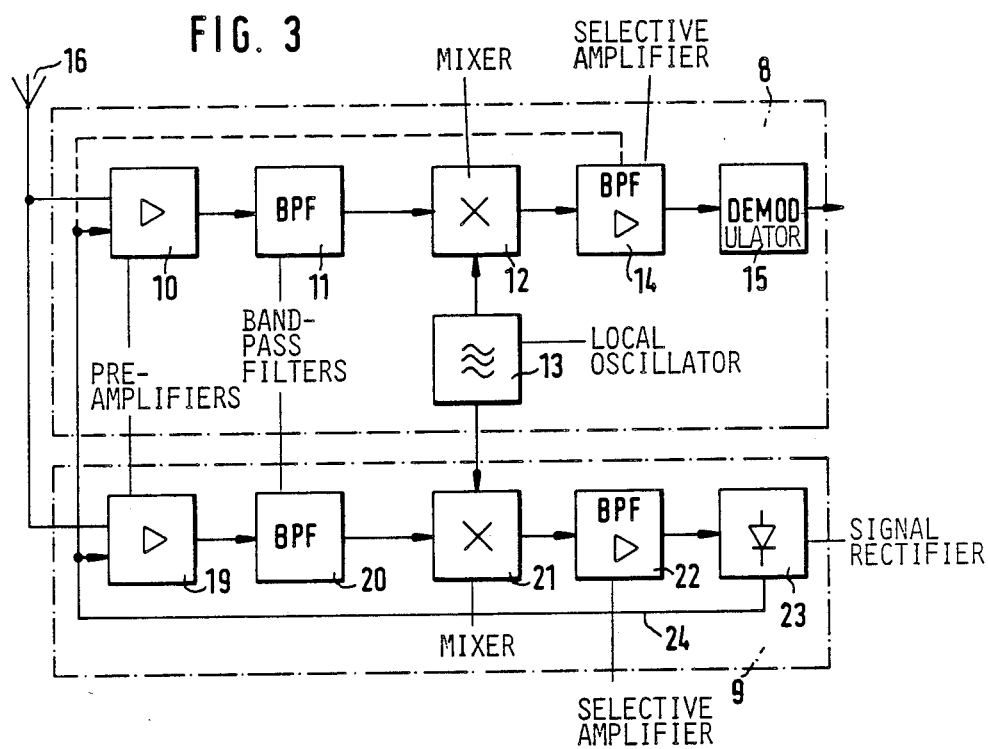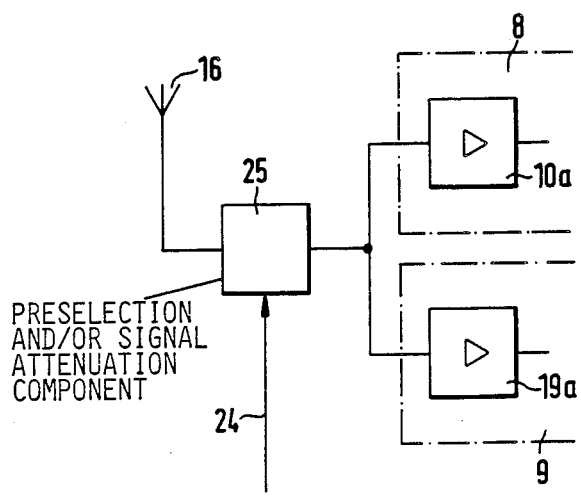

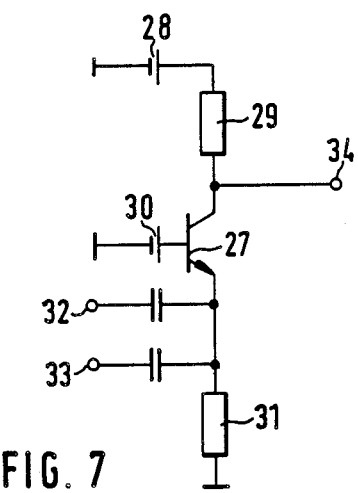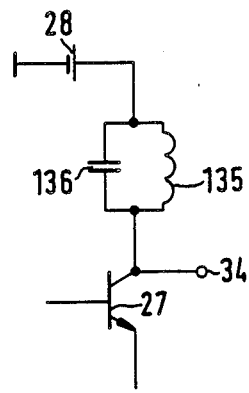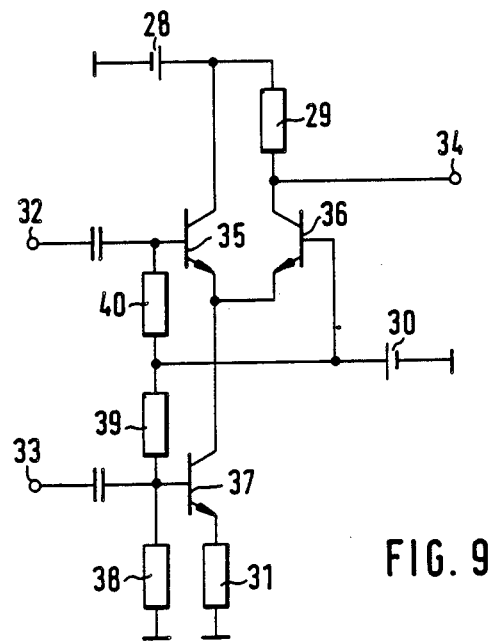
FIG. 7    FIG. 8
FIG. 9

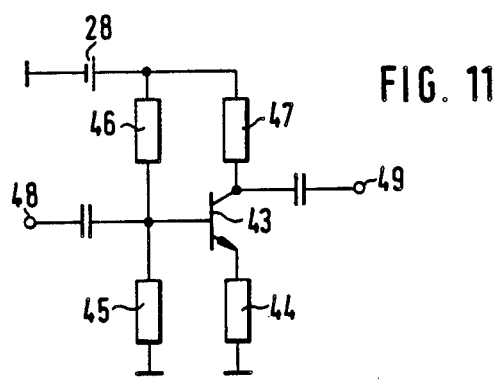
FIG. 11
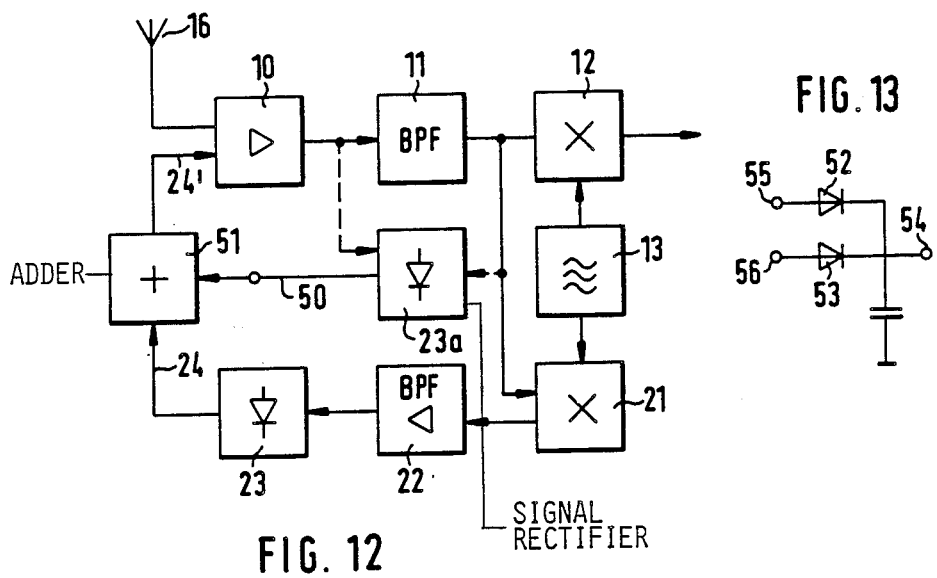
FIG. 12
FIG. 13

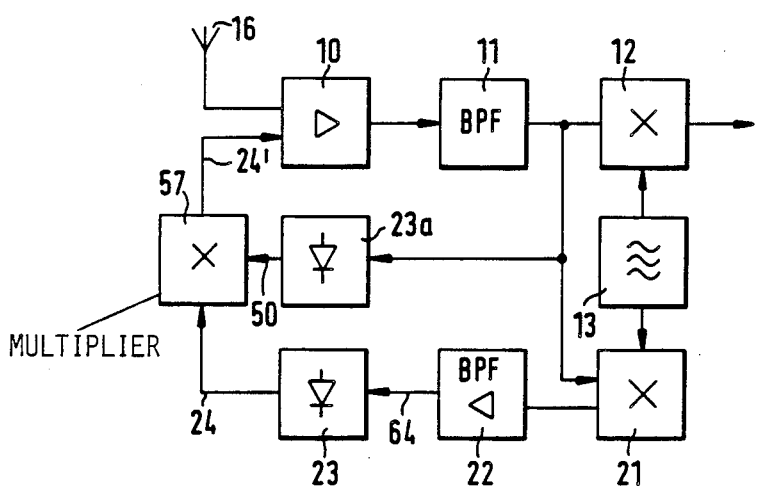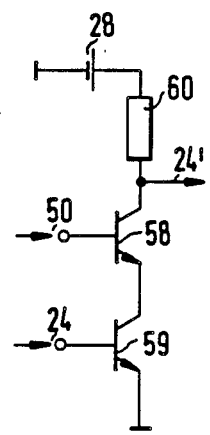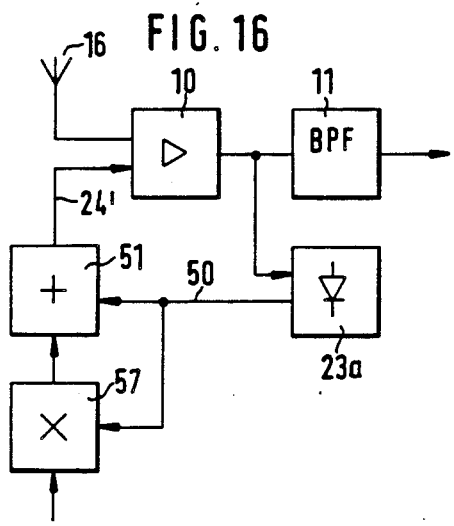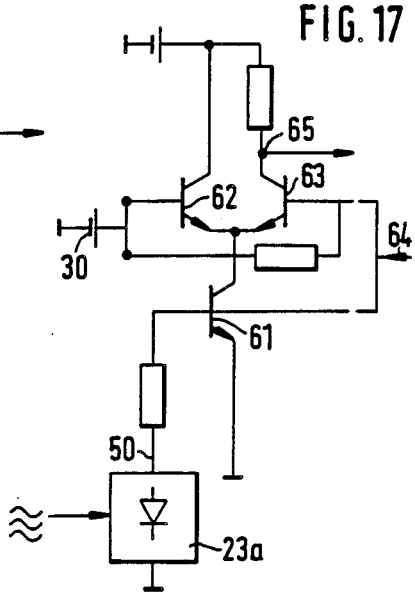

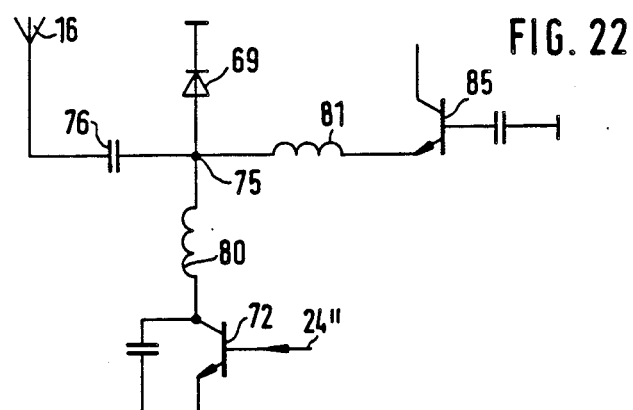
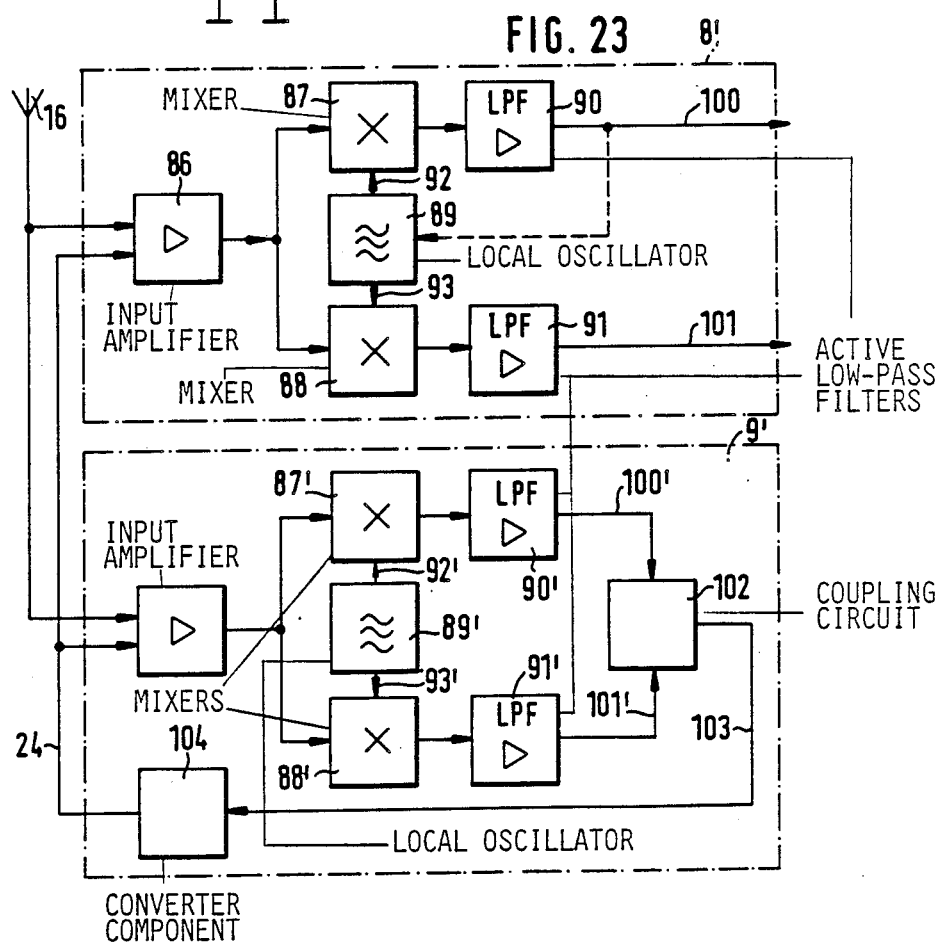

RADIO RECEIVER

This application is a continuation, of application Ser. No. 06/807,343, filed Dec. 9th, 1985, now abandon.

BACKGROUND OF THE INVENTION

The invention relates to a radio receiver in which the received signal is converted by mixing into an intermediate frequency signal and/or a baseband signal, and in which an apparatus is provided which generates an intermediate frequency signal and/or baseband signal and derives therefrom a control signal for suppression or reduction of interfering disturbances.

As is well-known, the purpose of radio receivers is to receive electromagnetic waves. Radio receivers are, for example, radio broadcast receivers, television receivers or radiotelephones.

The problem that a signal spectrum whose spectral components may exhibit level differences of up to 120 dB must be processed by the receiver is known to occur in radio receivers. The high-level signal components mostly result in interfering disturbances such as, for example, multiple reception through harmonic mixing and intermodulation. Such disturbances are known to be caused by the signal-dependent driving of the non-linear components located in the signal path.

The intermodulation disturbances are particularly critical since they may already occur at a relatively low disturbance signal level. Intermodulation disturbances are disturbances which are caused by at least two disturbance signals and constitute a disturbance when the frequencies of, for example, two disturbance signals with the frequencies $f_{s1}$ and $f_{s2}$, respectively, have such a constellation in relation to each other that one of the two conditions $$2f_{s1}-f_{s2}=f_e \text{ or } 2f_{s2}-f_{s1}=f_e$$

is met, with $f_e$ being the frequency of the desired signal or the set receiving frequency.

In this case, an "apparent" desired signal which - in the case of two disturbance signals - typically contains the modulation content of both disturbance signals, may be received on the desired frequency. Such a reception situation is then mostly interpreted by the user, for example, the radio broadcast listener, as lacking selectivity of the receiver. Another disturbing effect of the intermodulation is the interference formation with a weaker desired signal, which could be satisfactorily received, for example, without intermodulation or at low intermodulation. The danger of the disturbing effect of high-level signal components at the receiver input generally increases overproportionally with the number of high-level signal components and with their level. In most cases, intermodulation disturbances in a radio receiver are formed in the receiver stages before the channel selection, i.e., in the receiver prestage (RF) or in the mixing stage. Components which cause such disturbances are, for example, bipolar transistors, field-effect transistors and diodes; varactor diodes are also included in the intermodulation forming components.

In technical literature, the intermodulation behavior of a radio receiver is characterized by the so-called intercept point. It is the third order intercept point that is meant. The intercept point is apparent from the diagram of FIG. 1. Indicated in this diagram, on the abscissa axis are the level of the desired signal $P_e$ and also the levels $P_{s1}$ and $P_{s2}$ of the two disturbance signals causing the intermodulation, and on the ordinate axis, as an example, the intermediate frequency signal level $P_{if}$ at the output of the receiver mixing stage. Curve 1 shows the output signal level $P_{if}$ in dependence upon the desired signal $P_e$. Curve 2 describes the dependency of the output level $P_{if}$ on disturbance signal levels $P_{s1}$ and $P_{s2}$, which cause the intermodulation (3rd order). In the illustration of the dependency it is assumed that both axes of FIG. 1 have logarithmic graduation, that the two disturbance signal levels are, furthermore, identical in size and that there is also no amplification control in the signal path. It is, furthermore, assumed that the level at which a signal/noise ratio of 30 dB occurs at the receiver output, in relation to a predetermined desired signal modulation, is regarded as the smallest desired signal level in the diagram (zero point of the abscissa axis). The point of intersection of the two curve tangents produces a fictitious point in the diagram, the so-called intercept point, which is associated with a certain input level, the fictitious level of the disturbance signals forming the intermodulation and a certain fictitious IF output level. The gradients of the two curve tangents typically differ by the factor 3. In radio receivers, the intercept point is generally indicated in relation to the receiver input level.

A large level value of the intercept point is aimed at for a radio receiver. The larger this value is, the larger are the disturbance signal levels which the receiver can process without a disturbing effect through intermodulation. An increase in the intercept level of a receiver is, however, limited by economic considerations.

In order to reduce intermodulation disturbances or, more generally, interfering disturbances, it is known to control the amplification at the receiver input in dependence upon the input signal, for example, by controlling an amplification component or by controlling a damping member comprised, for example, of PIN diodes. In known radio receivers, the control signal controlling the amplification or damping is produced, for example, by rectification of the amplified intermediate frequency signal and/or by rectification of the signal before the channel selection, for example, via the output of the prestage or via the input or the output of the mixing stage.

The positive effect of such a control for decreasing interfering disturbances does, however, only occur when the component controlling the amplification or the damping is arranged before the receiver stage forming the interference, and the controlled component itself does not contribute towards the interference.

A radio receiver circuit is known from U.S. Pat. No. 4,126,828, wherein a separate apparatus whose task it is to recognize intermodulation disturbance and which supplies a control signal for automatic damping of the antenna signal, is provided for reduction of intermodulation disturbances. This apparatus consists of a mixer which is fed by a non-linear circuit stage. The mixer receives its second signal from the oscillator of the receiver. The non-linear apparatus is controlled by the output of the high frequency stage of the radio receiver. The output signal of the mixer controls an intermediate frequency amplifier whose output signal is rectified. The rectified signal is compared in a comparator circuit with the rectified intermediate frequency signal of the radio receiver. If the rectified signal of the apparatus is larger than the rectified intermediate frequency signal of the radio receiver, a control signal is generated for damping the antenna signal. The damping of the antenna signal is effected to such an extent that the two rectified signals assume almost the same value. The effect produced by the larger non-linearity of the separate apparatus in comparison to the non-linearity of the radio receiving section is that the intermediate frequency signal effected by intermodulation forming disturbance signals may become larger than the intermediate frequency signal corresponding to the desired received signal.

The disadvantage of the known circuit is that in the presence of disturbance signals which do not lead to disturbing intermodulation, or in the case of strong desired signals, no signal attenuation is effected. This results in sequential disturbances such as, for example, modulation distortions or cross modulation.

SUMMARY OF THE INVENTION

The object underlying the invention is to provide a radio receiver which is capable of at least substantially suppressing interfering disturbances, in particular, through intermodulation, and which, also in the case of disturbance signals which do not lead to disturbing intermodulation, or in the case of strong desired signals, effects a signal attenuation.

In a radio receiver, in accordance with the invention, in which the received signal is converted by mixing into an intermediate frequency signal and/or a baseband signal, and in which an apparatus is provided which generates an intermediate frequency signal and/or baseband signal and derives therefrom an control signal for suppression or reduction of interfering disturbances, the signal fed to the apparatus is distorted in the apparatus in such a way that the signal distortion effected in the apparatus is greater than the distortion to which the signal fed to the receiver is subjected in the receiving section of the receiver, and the output signal of the apparatus is fed to the receiver input stage to damp the received signal.

The signal distortion takes place in the apparatus in the signal path between the input of the apparatus and the output of the mixer of the apparatus. The signal distortion takes place, for example, in the mixer and/or preamplifier of the apparatus, and more particularly, for example, by correspondingly low negative signal feedback (which is lower than the desired negative signal feedback) and/or by corresponding operation point setting of components in the preamplifier and/or mixer of the apparatus.

It is also possible to connect distortion forming components to the preamplifier and/or mixer of the apparatus in order to obtain the desired distortion. The connected components are designed to effect the desired distortion. This is, however, also applicable to components of the mixer and/or components of the preamplifier of the apparatus.

The control signal produced by the apparatus is fed to the input stage of the receiver and preferably also to the input of the apparatus. If the control signal is also fed to the input stage of the apparatus for signal attenuation, the control signal effects, on the condition that the electrical characteristics between control signal and signal attenuation of the input stage of the receiver and the apparatus are, as far as possible, identical, an optimal suppression of the signal disturbance (intermodulation) over a larger level range. The control signal produced by the apparatus and fed to the input stage of the receiver is used for signal attenuation in the signal path of the receiver. For this purpose, a controllable component located in the signal path of the receiver is, for example, controlled by the control signal. The control signal produced by the apparatus serves, for example, to increase the preselection of the receiver. An increase in the preselection of the receiver is, for example, effected by changing the signal transformation between signal source and selection means.

The apparatus provided in accordance with the invention for producing the control signal generally comprises a preamplifier, a band-pass filter, a mixer, a selective intermediate frequency amplifier and a rectifier. It is, however, not necessary for all of the components of the apparatus to be provided separately, it is also possible for certain components of the receiver which are required for the receiver in any case, to also be used for the apparatus, which eliminates double provision of these components. It is, for example, possible to use the preamplifier of the receiver as preamplifier of the apparatus. It is likewise possible to use the mixer of the receiver as mixer of the apparatus.

One embodiment of the invention consists, for example, in the provision of a separate selective amplifier (IF amplifier) and also a separate signal rectifier for the apparatus, with the selective amplifier receiving its input signal from the mixer output of the receiving section. In this case, the desired signal distortion takes place in the selective amplifier of the apparatus.

In accordance with an embodiment of the invention, the control signal produced by the apparatus is fed, in addition to the receiver input, also to the selective amplifier of the receiver. The midband frequency of the selective amplifier of the apparatus is preferably identical to the midband frequency of the selective amplifier of the receiver. The selectivity of the selective amplifier of the apparatus is preferably smaller than the selectivity of the selective amplifier of the receiver. In an embodiment of the invention, only one single tuned circuit is provided for selection in the selective amplifier of the apparatus.

The radio receiver according to the invention effects not only a reduction in the intermodulation disturbances, but is also capable of suppressing disturbances occurring through harmonic mixing, as is, for example, the case in the presence of high-level disturbance signals whose frequency is higher than the receiving frequency by half the intermediate frequency or two-thirds the intermediate frequency.

A deliberate distortion of a signal, which is synonymous with a reduction in the intercept level of the circuit causing the distortion is effected by deliberately produced higher non-linearities of components or by connecting additional components thereto. Particularly strong non-linearities are, for example, attained in a transistor by there being no or only slight negative feedback. An increased non-linearity of a receiver stage may, for example, be effected in a simple manner by alteration of the operation point of the active amplifier component of the stage.

When desired signals are received, in an apparatus according to the invention, the control signal only becomes effective at desired signal levels already indicating an adequate signal/noise ratio, whereas with the occurrence of interference signals, in particular, intermodulation products, the control variable already becomes effective at such disturbance levels that the receiving path is not disturbed or only to a slight extent. Also, the control variable only becomes effective when the frequency constellation of the disturbance signals would cause a disturbance in the desired channel.

BRIEF DESCRIPTION OF THE DRAWINGS

The invention will now be described in greater detail, by way of examples, with reference to the drawings, in which

FIG. 3 shows the signal section of a radio receiver and the inventive apparatus;

FIG. 4 shows a circuit component for the preselection;

FIG. 7 shows the mixing stage of the apparatus;

FIG. 8 shows the use of a tuned circuit instead of a collector resistor;

FIG. 9 shows a further embodiment of a mixing stage of the apparatus;

FIG. 11 shows the input stage of a selective amplifier of the apparatus;

FIG. 12 shows the feeding of the control signal to the apparatus;

FIG. 13 shows an adding circuit;

FIG. 14 shows the feeding of the control signal to a multiplier;

FIG. 15 shows a multiplier circuit;

FIG. 16 shows the combination of a multiplier with an adder;

FIG. 17 shows an embodiment of the coupling circuit of FIG. 16;

FIG. 22 shows the input circuit of a receiver prestage;

FIG. 23 shows the conversion of the input signal into a baseband signal;

DESCRIPTION OF THE PREFERRED EMBODIMENTS

Figure 1:
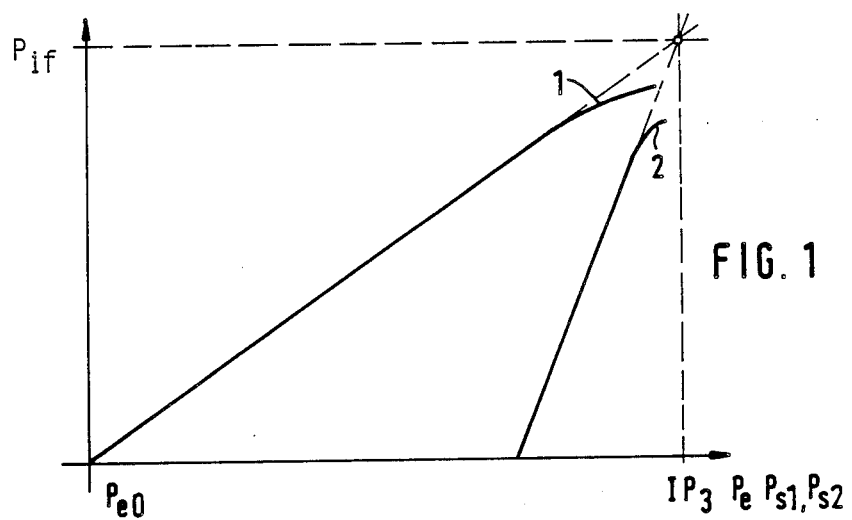
FIG. 1 shows the intermodulation behavior of a radio receiver.
Figure 2:
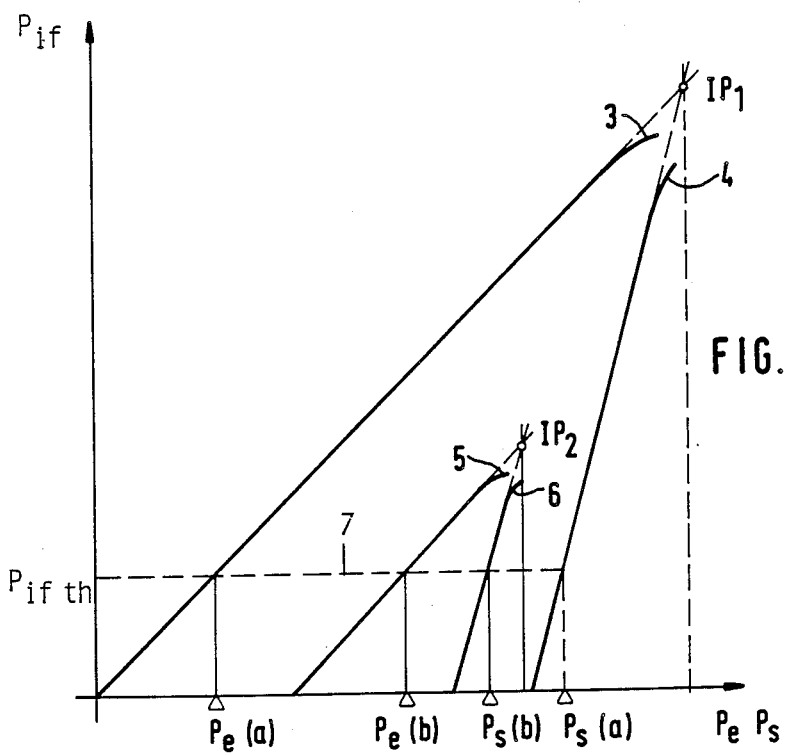
FIG. 2 shows the dependency of the output level caused by the disturbance signals.

FIG. 2 shows the behavior of a receiver with respect to the desired signal, the intermodulation forming disturbance signal levels and also the control application points. The curves of FIG. 2 show the dependency of the IF level $P_{if}$ on the desired signal level $P_e$ and also on the disturbance signal level $P_{s1}$ and $P_{s2}$ in double logarithmic representation. The curve 3 shows the dependency of the IF level caused by intermodulation on the disturbance signal level $P_{s1}$ and $P_{s2}$. The points of intersection of the curves 3 and 4 form the intercept point of the receiver $IP_1$.

For the control signal generation, the apparatus according to the invention serving to produce the control signal, has, in accordance with the point of intersection of the tangents of the curves 5 and 6, a lower intercept point $IP_2$ than the receiver $IP_1$. In the illustration of FIG. 2, $P_{ifth}$ is the IF level at which the control signal becomes effective (control signal threshold). The point of intersection of the dashed line 7 with the line 5 produces the desired signal level $P_e(b)$, at which the control signal becomes effective. The point of intersection of the line 7 with the curve 6 produces the level $P_s(b)$ of the disturbance signals at which the control signal becomes effective. If the control signal were produced as in known radio receiver circuits, one would obtain, for example, the corresponding application points of the control for the desired signal at $P_e(a)$ and for the disturbance signal level at $P_s(a)$.

With the inventive apparatus for producing the control signal, application of the control of the amplification or damping or preselection of the receiver at low disturbance signal levels and, on the other hand, only at high desired signal levels, is attained. A high-level disturbance signal or disturbance signal pairs whose intermodulation products do not fall into the receiving channel do, however, not produce a control signal. In this way, disturbing intermodulation products are, on the one hand, effectively decreased, and, on the other hand, the reception of weak signals is not impaired by "nondisturbing" high-level signals which are not desired signals. The effect of application of the control at higher desired signal levels is that the attainable signal/noise ratio at the output of the receiver can exhibit an adequate value. The inventive circuit enables by corresponding selection of the non-linearity required to obtain the distortion and thus by corresponding selection of the intercept point of the apparatus producing the control signal, setting of the application point of the control such that the control already commences before the intermodulation disturbance is perceived by the receiver and this suppression is maintained in a larger level range of the disturbance signals.

FIG. 3 shows in its upper part the signal section 8 of a radio receiver and in the lower part the apparatus 9 provided in accordance with the invention for producing the control signal. The signal section 8 of the receiver consists in the embodiment of a preamplifier stage 10, a band-pass filter 11, a mixer 12, a local oscillator 13, a selective amplifier 14 (intermediate frequency amplifier) and a demodulator 15. The band-pass filter 11 is generally of tunable design. The input signal is fed from the antenna 16 to the input of the prestage 10 of the receiver, preselected in the band-pass filter 11 and converted in the mixing stage 12 with the aid of the local oscillator 13 into an intermediate frequency signal. The intermediate frequency signal is amplified in the selective amplifier 14 and demodulated in the demodulator 15.

The apparatus 9 for producing the control signal comprises in FIG. 3 a preamplifier stage 19, a band-pass filter 20, a mixer 21, a selective amplifier 22 and a signal rectifier 23. The apparatus 9 therefore likewise constitutes a signal section, as is also present in a similar manner in the arrangement 8. The apparatus 9 like the signal section 8 receives its input signal via the antenna 16. The input signal coming from the antenna is fed to the preamplifier stage 19 of the apparatus 9. The input signal which generally contains disturbance signal components leading in a certain constellation to interfering disturbances, is amplified in the prestage 19, preselected in the band-pass filter 20 and converted into an intermediate frequency signal in the mixer 21 with the aid of the oscillator signal fed to the mixer 21. The oscillator signal is generated by the oscillator 13. To the oscillator signal fed to the mixer 21 of the apparatus 9, the condition applies that it exhibit the same frequency as the oscillator signal fed to the mixer 12 of the signal section 8 of the receiver. In order to meet this condition, a common oscillator is preferably used for generating the oscillator signal for the signal section 8 and the apparatus 9. It is, however, of course, also possible to use separate oscillators if these oscillators supply a signal with the same frequency.

The intermediate frequency output signal of the mixer 21 is amplified by the selective amplifier 22. To the selective amplifier 22 the condition applies that the midband frequency of its pass-band be identical to the midband frequency of the selective amplifier 14 in the signal section 8. The condition that the selectivity of both selective amplifiers be identical need, however, not be met. By selectivity, the property of the suppression of a frequency-adjacent signal is meant.

It is recommendable, particularly in FM receivers, to even design the selectivity of the selective amplifier 22 of the apparatus 9 smaller than the selectivity of the selective amplifier 14 of the signal section 8. Intermodulation products exhibiting a higher modulation swing are thereby covered better by the following signal rectification and the directional signal is not influenced to a very large degree by the swing. Also, in addition to lower costs, lower selectivity favorably affects the tuning behavior of the receiver.

The output signal of the selective amplifier 22 is rectified in the rectifier 23. The rectified signal is the control signal 24. The signal 24 rectified by the rectifier 23 serves as control signal for the amplification control and/or control of the preselection, and, more particularly, in both the signal section 8 and the apparatus 9. In accordance with FIG. 3, the output signal of the rectifier 23 is, therefore, fed to both the preamplifier 10 of the signal section 8 and the preamplifier 19 of the apparatus 9. Selection means which may likewise be controlled by the control signal (output signal of the rectifier 23) are preferably present in the two preamplifiers.

In accordance with the invention, the apparatus 9 has a lower intercept point than the signal section 8 and, therefore, distorts the signal running through the apparatus 9 more than the signal running through the receiving section is distorted by the same. A lower intercept point and a higher distortion are attained by the preamplifier 19 and/or the mixer 21 exhibiting a correspondingly low intercept point. A lower intercept point is attained, for example, in a preamplifier and/or mixer by the negative feedback being correspondingly reduced and/or the operation point being placed such that the apparatus exhibits a higher non-linearity. In controlling the degree of distortion by negative feedback, the same is set so low in the apparatus 9 that, on the one hand, a control signal already occurs at lower disturbance signal levels and, on the other hand, the control signal is only produced at a higher desired signal level. The effect produced by the invention is that the level differences between desired signal and disturbance signal for the control application are reduced.

In the preamplifiers 10 and 19 of FIG. 3, not only an amplification, but, in general, also a preselection takes place. In this embodiment, the control signal 24 effects a change in the preselection and/or a signal attenuation. FIG. 4 shows a circuit component 25 which effects the preselection and/or signal attenuation commonly for the receiver 8 and for the apparatus 9. The preamplification for the receiver 8 and for the apparatus 9 is, however, effected in separate preamplifiers 10a and 19a in the embodiment of FIG. 4.

Figure 5:
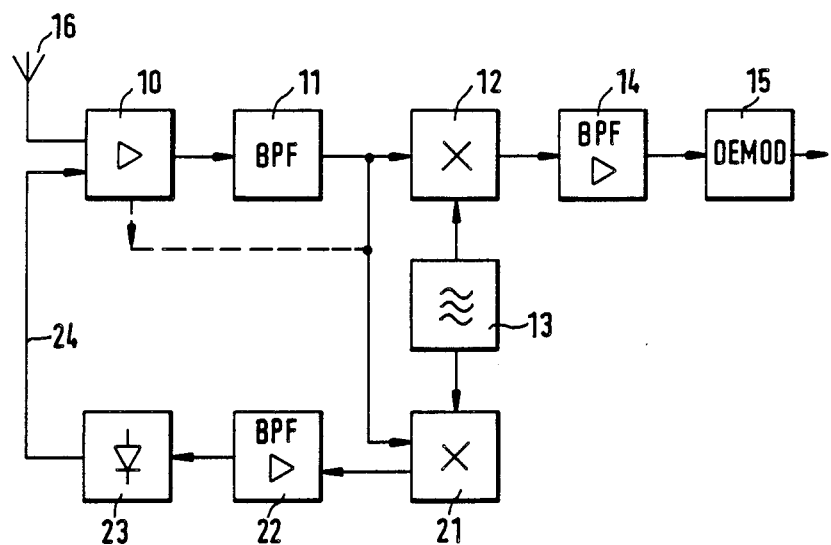
FIG. 5 shows the use of the preamplifier and the band-pass filter of the receiver for the apparatus.

FIG. 5 shows an embodiment of the invention, wherein the preselection, the signal attenuation and the preamplification of the receiver are used for the apparatus 9. The apparatus 9 of FIG. 5 does, therefore, not require a separate preamplifier and a separate band-pass filter but rather also makes use of the preamplifier 10 and the band-pass filter 11 of the receiver. In the embodiment of FIG. 5, the output signal of the band-pass filter 11 of the receiver is fed to the mixer 21. In the embodiment of FIG. 5, the separate mixer 21 may, however, also be driven by the input or output of the prestage 10. The distortion of the apparatus takes place in the embodiment of FIG. 5 in the mixer 21.

Figure 6:
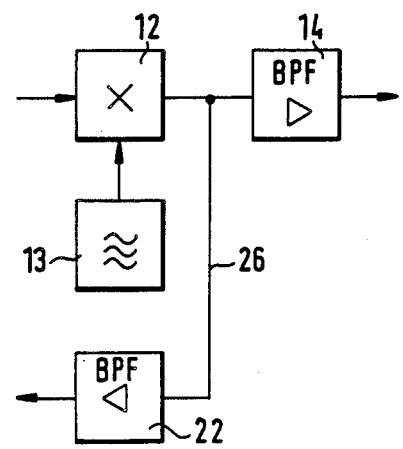
FIG. 6 shows the use of the preamplifier, the band-pass filter and the mixer of the receiver for the apparatus.

The embodiment of FIG. 6 differs from the embodiment of FIG. 5 in that not only the preamplifier 10 and the band-pass filter 11 of the receiver are also used for the apparatus, but also the mixer 12.

In the arrangement of FIG. 6, a separate mixer for the apparatus is, therefore, also not required. The output signal 26 of the mixer 12 is fed to the selective amplifier 22 in FIG. 6. The distortion takes place in the amplifier 22.

FIG. 7 shows an embodiment for the separate mixing stage 21 of the apparatus. The mixing stage of FIG. 7 consists of a transistor circuit in common-base circuit, wherein the received signal and the oscillator signal are fed to the emitter of the transistor 27. The operation point setting of the transistor 27 is effected via the operating voltage source 28, the collector resistor 29, the base voltage source 30 and the emitter resistor 31. The signals are fed to the terminal 32 and the terminal 33, respectively. The output signal is taken from the terminal 34.

The embodiment of FIG. 8 differs from the embodiment of FIG. 7 in that instead of the collector resistor 29, a selection circuit with the coil 35 and the capacitor 36 is used. The resonance frequency of the selection circuit is preferably identical to the intermediate frequency of the receiver.

FIG. 9 shows the embodiment of a mixing stage of the apparatus. The mixing stage of FIG. 9 comprises the three transistors 35, 36 and 37. In accordance with FIG. 9, the collector of the transistor 37 is connected to the connection point of the emitters of the transistors 35 and 36. The one control signal for the mixing stage is fed to the base of the transistor 37 and the other control signal to the base of the transistor 35. The intermediate frequency output signal is taken from the collector of the transistor 36. The resistors 31, 38, 39 and 40 serve to set the operation points of the circuit.

Figure 10:
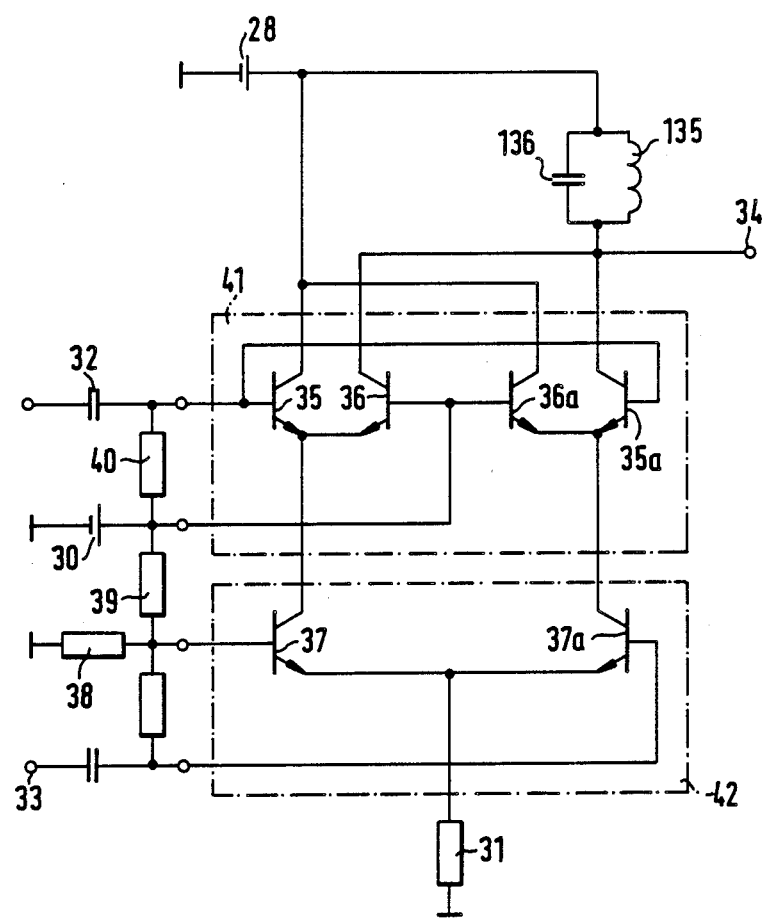
FIG. 10 shows a modification of FIG. 9.

The arrangement of FIG. 10 differs from the arrangement of FIG. 9 in that instead of the transistor pair 35, 36, a transistor quartet 41 and instead of the transistor 37, a transistor pair 42 is provided.

The mixer circuits of FIGS. 7 to 10 are different because the mixers of the receiver and of the apparatus must be adapted with respect to their distortion properties and such adaptation is facilitated by the different mixers of FIGS. 7 to 10.

FIG. 11 shows the input stage of a selective amplifier 22 of the apparatus. It consists of the transistor 43, the emitter resistor 44, the voltage divider 45, 46 and the external resistor 47. The operation point and/or the negative feedback of the stage of FIG. 11 is selected such that the signal fed to the input terminal 48 is distorted in accordance with the invention as far as the output 49.

FIG. 12 shows an embodiment of the invention, wherein a control signal 24' composed of the signal 24 produced by the apparatus and a signal 50 produced by rectification of a signal taken from the output of the prestage 10 or from the output of the band-pass filter 11 is fed to the input stage 10 of the receiver. Both signals are added in the adder 51 and produce the control signal 24'. The task of the signal 50 is to avoid an overloading of the input stage and/or mixing stage of the receiver when the signal generated by the apparatus is not effective.

FIG. 13 shows the configuration of an adding circuit 51. It comprises two diodes 52 and 53 which are connected to the output 54. The terminals 55 and 56 are fed the signals 24 and 50. In the circuit of FIG. 13, the strongest input signal determines the control signal at the output 54.

In the embodiment of FIG. 14, the two signals in accordance with FIG. 12 are not fed to an adder but to a multiplier 57. Instead of a multiplier, an AND circuit may also be provided.

FIG. 15 shows an example of a multiplier and AND circuit, respectively. The circuit of FIG. 15 consists of the series connected transistors 58 and 59 and also the output resistor 60. In the present case, a multiplier or AND circuit has the advantage that the control signal resulting from the two signals does not occur until the second signal is generated via the rectifier 23a. The second signal preferably occurs only with relatively strong input signals (from the antenna). As a result, the signal generated in the apparatus only becomes effective with relatively strong desired signals.

In the arrangement of FIG. 16, the combination of a multiplier 57 with an adder 51 is provided as coupling circuit. Such a combination has the advantage that, on the one hand, an overloading of the prestage and/or mixing stage of the receiver is prevented, and, on the other hand, the signal 24 of the apparatus only becomes effective with relatively strong desired signals.

FIG. 17 shows an embodiment for the coupling circuit of FIG. 16 and also for the rectifier circuit 23 of FIG. 14. The circuit of FIG. 17 comprises the transistors 61, 62 and 63. The second signal 50 is fed to the base of the transistor 61, while the output signal 64 of the selective amplifier 22 of the apparatus is fed to the bases of the transistors 62 and 63. The resulting control signal is taken from the circuit point 65.

Figure 18:
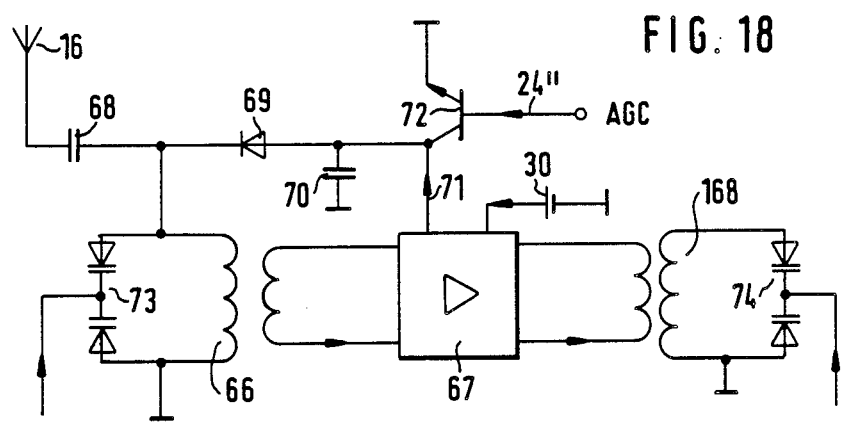
FIG. 18 shows a receiver prestage with a controllable signal attenuation.

FIG. 18 shows an embodiment of a receiver prestage with a controllable signal attenuation. The prestage of FIG. 19 comprises a tunable perselection circuit 66, an active amplifier 67 and a tunable output circuit 68. The antenna 16 is transformatically coupled via the capacitor 68 to the preselection circuit 66. The signal attenuation is carried out by a PIN diode 69 which as controllable alternating-current resistor is connected in parallel via the capacitor 70 to the preselection circuit 66. The current serving to control the PIN diode is derived from the operating current 71 of the stage 67. The transistor 72 which acts as controllable shunt resistor and is controlled by the control signal 24" serves to control the current fed to the PIN diode 69. The control signal 24" is derived from the control signal 24 and 24', respectively. The tuning of the tuned circuits 66 and 68 is carried out by varactor diodes 73 and 74.

The circuit of FIG. 18 has the advantage that the entire receiver circuit is protected by the control signal against disturbing interferences by the signal attenuation at the preselection circuit 66. The PIN diode has the advantage that it does not cause any distortions at higher frequencies. The circuit of FIG. 18 is particularly well suited for FM radio broadcast receivers.

Figure 19:
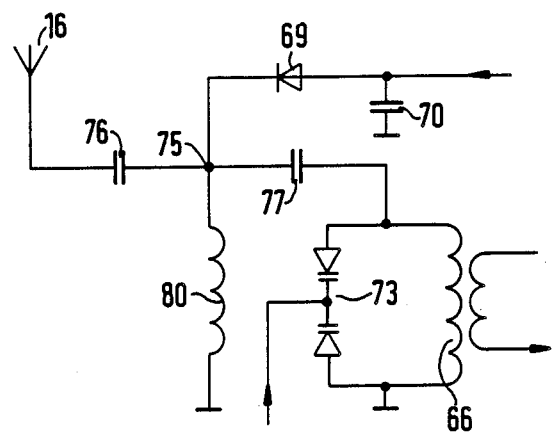
FIG. 19 likewise shows a prestage.

The arrangement of FIG. 19 differs from the arrangement of FIG. 18 in that the PIN diode 69 acts on the circuit point 75. The transformation of the antenna resistance to the preselection circuit 66 is carried out via the circuit point 75. By means of the controllable PIN diode 69, the signal attenuation is controlled in such a way that the selectivity between antenna and amplifier 67 increases with an increase in the signal attenuation. With the control of the signal attenuation, the transformation of the antenna resistance to the preselection circuit 66 is simultaneously controlled.

The network provided for the transformation of the antenna resistance to the selection circuit 66 comprises the capacitors 76 and 77 and also the coil 80. The network has the characteristic that - in relation to the circuit point 75 - the highest impedance occurs within the receiving band and that this impedance is substantially larger than the antenna resistance.

Figure 20:
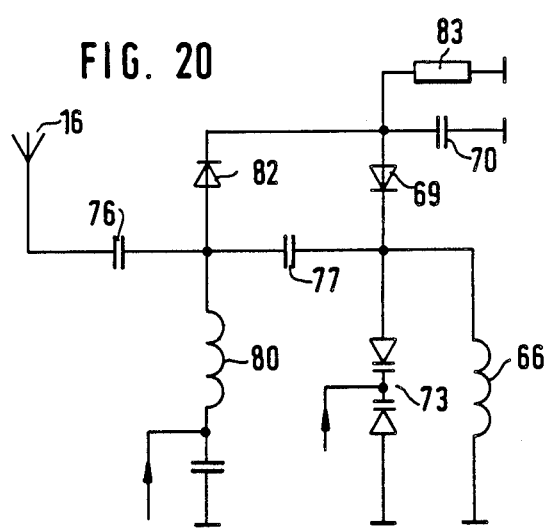
FIG. 20 shows the signal damping at the input of the receiver prestage.

FIG. 20 shows an embodiment of the signal damping at the input of the receiver prestage wherein a second PIN diode 82 is provided. The effect produced by the two PIN diodes is that the circuit of FIG. 20 exhibits a combination of the characteristics of the arrangements of FIGS. 18 and 19. The effect of the additional resistor 83 is that the signal damping is carried out by the PIN diode 69 at a higher level than the signal damping by the PIN diode 82.

Figure 21:
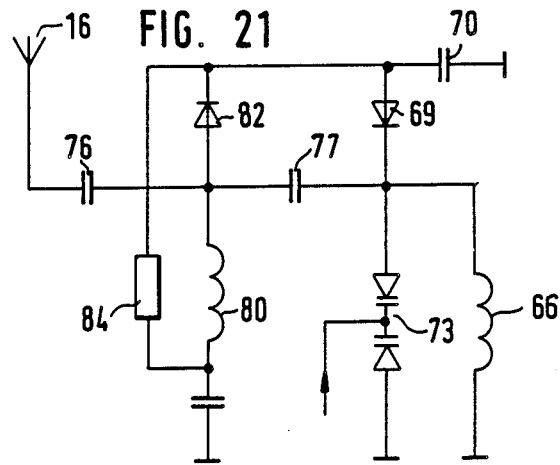
FIG. 21 shows a modification of the signal damping of FIG. 20.

The circuit of FIG. 21 differs from the circuit of FIG. 20 in that the resistor 83 of the circuit of FIG. 20 is missing in it and instead of it the resistor 84 is provided between one end of the coil 80 and the cathode of the PIN diode 82. A reversal of the conditions is thereby attained, i.e., the signal damping by the PIN diode 82 starts at a higher level than the signal damping by the PIN diode 69.

FIG. 22 shows the input circuit of a receiver prestage wherein a transistor 85 in common-base circuit is provided as amplifier transistor. The antenna is coupled via a network to the emitter of the transistor 85. The network consists of the capacitor 76, the coil 80 and the coil 81. The network is so dimensioned that the largest impedance occurs at the midband frequency of the receiving band - in relation to the circuit point 75. The PIN diode 69 is arranged between the circuit point 75 and the reference point. The controlling of the PIN diode is carried out via the shunt transistor 72 by means of the signal 24". The circuit of FIG. 22 does not require a tunable input circuit.

FIG. 23 shows an embodiment of the invention, wherein the input signal of the receiver is not converted into an intermediate frequency signal, but directly into a baseband signal. The circuit of FIG. 23 comprises in conformity with FIG. 3 a receiving section 8' and an apparatus 9' for producing a control signal 24. The receiving section 8' consists of the input amplifier 86, the mixers 87 and 88, the oscillator component 89 and the active low-pass filters 90 and 91. The input amplifier 86 is preferably in the form of a tunable selective amplifier. The oscillator component 89 produces two signals 92 and 93 offset with respect to each other by 90°, which are fed to the mixers 87 and 88. In the case of a synchronous demodulation of the input signal, it is necessary to return the signal formed at the output of the amplifier 90 to the oscillator component 89 controllable in the frequency. The mixer 87, the active low-pass filter 90 and the controllable oscillator component 89 form a phase-control loop. It controls the synchronous demodulation of the receiving section 8'. At the output of the active low-pass filter 90 there is thereby formed a low frequency signal 100 corresponding to the frequency modulation of the signal, while a signal quantity 101 corresponding to the amplitude of the signal is formed at the output of the active low-pass filter 91. The amplified input signal is fed to the mixers 87 and 88.

The apparatus 9' of FIG. 23 comprises essentially the same components as the receiving section 8' of FIG. 23. The desired signal distortion takes place in the apparatus 9' in the signal path from the input to the output of the mixers 87' and 88'. The oscillator component 89' of the apparatus supplies the same or similar signal frequency as the oscillator component 89 of the receiving section. The output signals 92' and 93' may, however, also be derived directly from the oscillator component 89 and its signals 92 and 93, respectively. In contrast to the receiving section 8', in order to obtain the control signal 24, the output signals 100' and 101' are coupled in the coupling circuit 102 and the output signal 103 of the coupling circuit 102 is converted in the circuit component 104 into the control signal 24.

Figure 24:
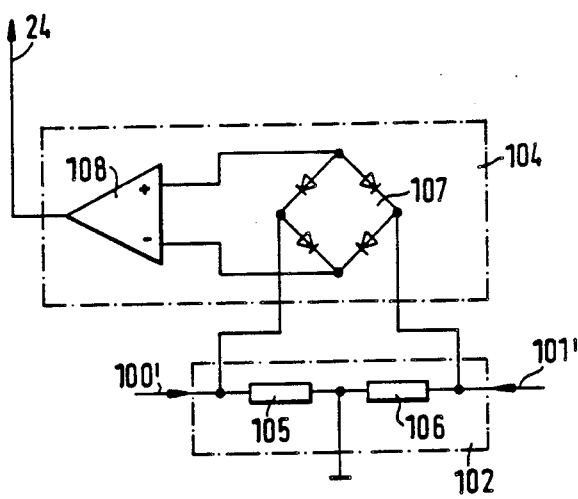
FIG. 24 shows an embodiment of a coupling circuit.

FIG. 24 shows an embodiment for the coupling circuit 102 and the circuit component 104. The coupling circuit consists in the simplest form of an adding circuit with the resistors 105 and 106. The composite signal formed from the signals 100' and 101' and thus independent of the polarity of the potential difference. The circuit components 102 and 104 therefore produce a control signal 24 which corresponds to that of the amplitude of the received signal.

Figure 25:
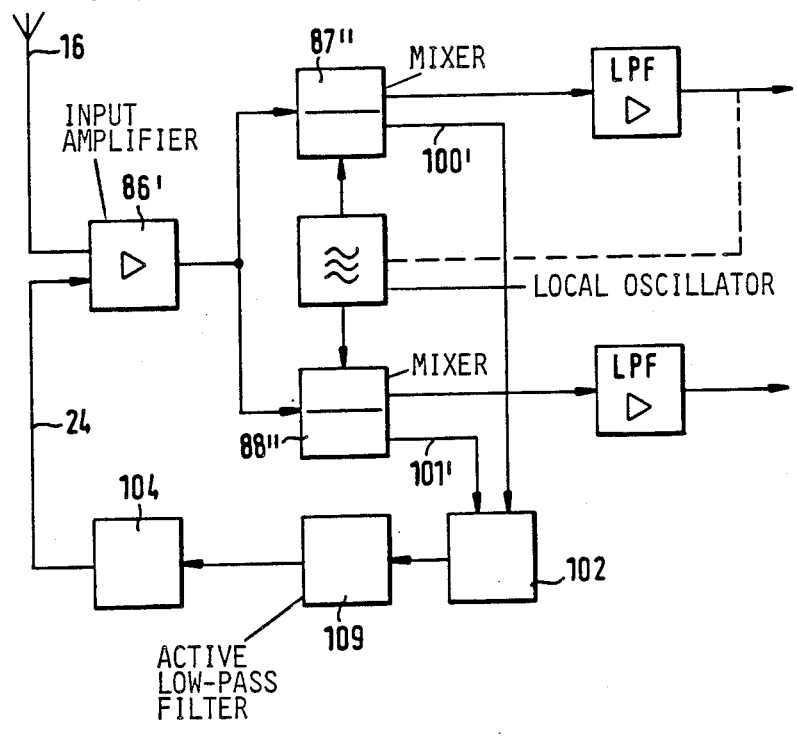
FIG. 25 shows a receiver with synchronous modulation.

FIG. 25 shows an embodiment for a receiver with synchronous demodulation. Compared with the embodiment according to FIG. 23, the apparatus 9' uses components of the receiving section 8', and, more particularly, the input amplifier 86' including the signal attenuation within the input stage 86'. The output signals 100' and 101" of the mixers 87" and 88" are fed to the signal coupling circuit 102, while the output signal of the coupling circuit 102 is fed to the active low-pass filter 109. The output signal of the active low-pass filter 109 is fed to the circuit component 104 and converted into the control signal 24.

What is claimed is:
1. A radio receiver for receiving an input signal in a first frequency range, which input signal contains a desired signal and undesired disturbance signals, said receiver comprising:
   a receiving section including an input stage for receiving the input signal and a first mixer connected to said input stage for converting the input signal into an output signal in a second frequency range which is different than the first frequency range; and
   apparatus including: signal distortion means connected for generating a signal which is a distorted version of the input signal having a degree of distortion greater than that of the output signal; signal deriving means connected to said signal distortion means for deriving a control signal from the distorted signal; and signal conducting means connected for supplying the control signal to said input stage of said receiving section for varying the amplitude of the input signal in a manner to at least reduce the interference of the disturbance signals contained in the input signal.

2. A radio receiver according to claim 1 wherein said apparatus comprises an input, a signal path extending from said input, and a second mixer connected in said signal path, and said signal distortion means are disposed in said signal path at a location between said input and the output of said second mixer.

3. A radio receiver according to claim 1 wherein said apparatus comprises a second mixer containing said signal distortion means.

4. A radio receiver according to claim 1 wherein said apparatus comprises a preamplifier containing said signal distortion means.

5. A radio receiver according to claim 1 wherein said apparatus comprises a preamplifier and a second mixer connected to said preamplifier, and said signal distortion means are disposed in said preamplifier and said second mixer.

6. A radio receiver according to claim 1 wherein said apparatus comprises a preamplifier and a second mixer connected to said preamplifier, and said signal distortion means comprise means for establishing a low negative signal feedback in one of said preamplifier and second mixer.

7. A radio receiver according to claim 1 wherein said apparatus comprises a preamplifier and a second mixer connected to said preamplifier, and said signal distortion means comprise means setting a selected operating point in one of said preamplifier and second mixer.

8. A radio receiver according to claim 1 wherein said apparatus comprises a preamplifier and a second mixer connected to said preamplifier, and said signal distortion means comprise distortion forming components connected to one of said preamplifier and second mixer.

9. A radio receiver according to claim 1 wherein only the control signal is supplied to said input stage for varying the amplitude of the input signal.

10. A radio receiver according to claim 1 wherein said apparatus further comprises signal input means connected to said signal distortion means, and signal conducting means connected for supplying the control signal to said signal input means.

11. A radio receiver according to claim 1 wherein the control signal is supplied to said input stage for attenuating the input signal in said receiving section.

12. A radio receiver according to claim 11 wherein said receiving section comprises a controllable component connected to be controlled by the control signal.

13. A radio receiver according to claim 1 wherein said input stage of said receiving section includes signal preselection means, and said control signal is applied to said input stage for increasing the preselection effected by said preselection means.

14. A radio receiver according to claim 13 wherein said receiving section includes: a signal source for supplying the input signal to said input stage; and signal frequency selection means, and said preselection means are connected between said signal source and said frequency selection means for varying the signal transformation therebetween.

15. A radio receiver according to claim 1 wherein said apparatus comprises a preamplifier, a band-pass filter, a second mixer, a frequency selective intermediate frequency amplifier and a rectifier, all of which are connected together in series.

16. A radio receiver according to claim 1 further comprising a preamplifier forming part of said input stage of said receiving section and having an output connected to said signal distortion means of said apparatus.

17. A radio receiver according to claim 1 wherein said signal distortion means is connected to the output of said first mixer.

18. A radio receiver according to claim 1 wherein said signal distortion means comprise a selective amplifier connected to the output of said first mixer, and said signal deriving means comprise a signal rectifier connected to the output of said selective amplifier.

19. A radio receiver according to claim 1 wherein said input stage of said receiving section includes a frequency selective amplifier connected to receive the input signal and the control signal.

20. A radio receiver according to claim 1 wherein each of said receiving section and apparatus comprises a respective selective amplifier, and said selective amplifiers have identical midband frequencies.

21. A radio receiver according to claim 1 wherein said receiving section and said apparatus each includes a respective selective amplifier, and the selectivity of said selective amplifier of said apparatus is lower than that of said selective amplifier of said receiving section.

22. A radio receiver according to claim 21 wherein said selective amplifier of said apparatus contains only one single tuned circuit.

23. A radio receiver according to claim 1 further comprising a circuit component connected to said receiving section and said apparatus for effecting one of a signal preselection and signal attenuation for both said receiving section and said apparatus.

24. A radio receiver according to claim 1 wherein the signal distortion produced by said apparatus bears a selected relation to the signal distortion occurring in said receiving section.

25. A radio receiver according to claim 1 wherein said input stage of said receiving section comprises a preamplifier and a band-pass filter, said band-pass filter being connected between said preamplifier and said first mixer to form a series circuit therewith, and further comprising means connected to a point in said series circuit for rectifying the signal appearing at said point in said series circuit in order to produce a second signal.

26. A radio receiver according to claim 25 further comprising a coupling circuit for supplying said second signal together with said control signal to said input stage of said receiving section.

27. A radio receiver according to claim 26 wherein said coupling circuit is a circuit arrangement including an adder, a multiplier and an AND circuit.

28. A radio receiver according to claim 26 wherein said coupling circuit is a circuit arrangement including an adder and a multiplier.

29. A radio receiver according to claim 1 wherein said input stage comprises at least one PIN diode for influencing the input signal.

30. A radio receiver according to claim 29 wherein said input stage further comprises a source of operating current connected to supply control current to said PIN diode.

31. A radio receiver according to claim 1 wherein said input stage of said receiving section is constructed to effect a controlled input signal attenuation as a function of the value of the control signal.

32. A radio receiver according to claim 1 wherein said input stage of said receiving section is a frequency tunable device.

33. A radio receiver according to claim 1, wherein the further signal is distorted in such a way that interfering disturbances in the input signal are suppressed or reduced.

* * * * *